United States Patent
Snider et al.

(10) Patent No.: US 8,319,615 B2
(45) Date of Patent: Nov. 27, 2012

(54) APPARATUS AND METHOD FOR DETECTING JAMMING OF COMMUNICATIONS

(75) Inventors: James Snider, Kildeer, IL (US); Michael Cruz, Buffalo Grove, IL (US); Robert F. D'Avello, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 389 days.

(21) Appl. No.: 12/643,049

(22) Filed: Dec. 21, 2009

(65) Prior Publication Data

US 2011/0151768 A1  Jun. 23, 2011

(51) Int. Cl.
*B60R 25/10* (2006.01)

(52) U.S. Cl. ............... 340/426.1; 455/456.1; 340/426.2; 340/426.19

(58) Field of Classification Search ............... 455/404.1, 455/569.2, 575.9, 152.1, 456.1, 557; 340/438, 340/425.5, 426.1, 426.2, 426.18, 426.19, 340/426.21, 991, 993, 572.4; 348/148; 701/1, 701/213, 36, 200; 342/357.21, 457
See application file for complete search history.

(56) References Cited

U.S. PATENT DOCUMENTS

| | | | |
|---|---|---|---|
| 5,895,436 | A | 4/1999 | Savoie et al. |
| 6,330,438 | B1 | 12/2001 | McClelland et al. |
| 6,803,861 | B2 | 10/2004 | Flick |
| 2002/0014978 | A1 | 2/2002 | Flick |
| 2002/0163906 | A1 | 11/2002 | Diachina et al. |
| 2003/0222813 | A1* | 12/2003 | Boulay et al. ............ 342/159 |
| 2004/0005858 | A1 | 1/2004 | Cervinka et al. |
| 2004/0075539 | A1 | 4/2004 | Savoie et al. |
| 2005/0020203 | A1* | 1/2005 | Losh et al. .................... 455/11.1 |
| 2005/0048978 | A1* | 3/2005 | Santhoff et al. ............... 455/442 |
| 2005/0088318 | A1 | 4/2005 | Liu et al. |
| 2005/0090952 | A1 | 4/2005 | Boulay et al. |
| 2006/0007039 | A1 | 1/2006 | Duvall |
| 2006/0267744 | A1 | 11/2006 | Baumgartner et al. |
| 2007/0049323 | A1 | 3/2007 | Wang et al. |
| 2007/0079376 | A1 | 4/2007 | Robert et al. |
| 2007/0200688 | A1 | 8/2007 | Tang et al. |
| 2008/0186932 | A1 | 8/2008 | Do et al. |

(Continued)

FOREIGN PATENT DOCUMENTS

DE  10009488 A1  11/2000

(Continued)

OTHER PUBLICATIONS

International Search Report dated May 24, 2011, from corresponding International Patent Application No. PCT/US2010/060518.

(Continued)

*Primary Examiner* — Dominic E Rego (57) ABSTRACT

Location determination signals are received and a location of interest is determined from the location determination signals. A communication service with a known, valid base station via a first communication channel is established and synchronized. A first rate of rise of a signal strength indicator associated with the first communication channel is monitored and a second rate of rise of a signal quality indicator associated with the first communication channel is also monitored. When at least one of the first rate rises at a rate greater than a first predetermined threshold rate and the second rate rises at a rate greater than a second predetermined threshold rate, a warning message is transmitted to the known, valid base station before synchronization of the communication service is lost with the known, valid base station.

17 Claims, 4 Drawing Sheets

U.S. PATENT DOCUMENTS

| | | | | |
|---|---|---|---|---|
| 2009/0164067 | A1* | 6/2009 | Whitehead et al. | 701/41 |
| 2010/0103868 | A1* | 4/2010 | Meng et al. | 370/328 |
| 2010/0123622 | A1* | 5/2010 | Harper et al. | 342/357.09 |
| 2010/0210301 | A1* | 8/2010 | Dietz et al. | 455/556.1 |
| 2011/0151799 | A1* | 6/2011 | Snider et al. | 455/67.13 |

FOREIGN PATENT DOCUMENTS

| | | | |
|---|---|---|---|
| DE | 102004048668 | A1 | 4/2006 |
| EP | 0167442 | A2 | 1/1986 |
| EP | 1362753 | A1 | 11/2003 |
| EP | 1514444 | A1 | 3/2005 |
| EP | 1593564 | A1 | 11/2005 |
| EP | 1809057 | A1 | 7/2007 |
| EP | 2003818 | A1 | 12/2008 |
| EP | 2124428 | A1 | 11/2009 |
| GB | 2296843 | A | 7/1996 |
| GB | 2317418 | A | 3/1998 |
| GB | 2407455 | A | 4/2005 |
| GB | 2435987 | A | 9/2007 |
| GB | 2445046 | A | 6/2008 |
| GB | 2457102 | A | 8/2009 |
| WO | 95/33214 | A1 | 12/1995 |
| WO | 96/04155 | A1 | 2/1996 |
| WO | 00/21053 | A1 | 4/2000 |
| WO | 01/32481 | A1 | 5/2001 |
| WO | WO01/31797 | A1 | 5/2001 |
| WO | 03/103322 | A1 | 12/2003 |
| WO | 2005/112321 | A1 | 11/2005 |
| WO | 2006/092737 | A2 | 9/2006 |
| WO | 2007/019814 | A1 | 2/2007 |
| WO | 2008/111001 | A2 | 9/2008 |

OTHER PUBLICATIONS

International Search Report dated Mar. 28, 2011, from corresponding International Patent Application No. PCT/US2010/060803.
International Search Report dated Jun. 28, 2011, from corresponding International Patent Application No. PCT/US2010/060795.
International Search Report dated Jun. 17, 2011, from corresponding International Patent Application No. PCT/US2010/060787.
International Search Report dated Jun. 1, 2011, from corresponding International Patent Application No. PCT/US2010/060723.
International Search Report dated May 13, 2011, from corresponding International Patent Application No. PCT/US2010/060675.
International Search Report dated Apr. 15, 2011, from corresponding International Patent Application No. PCT/US2010/060773.
M. Mouly; M-B Pautet, "Mobility and Security Management" GSM System for Mobile Communications, Jan. 1, 1993, pp. 432-498, Europe Media, Lassay-Les-Chateaux, France.
International Search Report dated Apr. 12, 2011, from corresponding International Patent Application No. PCT/US2010/060760.
International Search Report dated Mar. 10, 2011, from corresponding International Patent Application No. PCT/US2010/060811.
International Search Report dated Mar. 1, 2011, from corresponding International Patent Application No. PCT/US2010/060750.
International Search Report dated Feb. 28, 2011, from corresponding International Patent Application No. PCT/US2010/060532.
International Search Report dated Mar. 1, 2011, from corresponding International Patent Application No. PCT/US2010/060527.

* cited by examiner

| RXLEV | Received signal level (dBm) |
|---|---|
| 0 | < -110 |
| 1 | -110 ~ -109 |
| ⋮ | ⋮ |
| 62 | -49 ~ -48 |
| 63 Strongest | > -48 |

*FIG. 4*

| RXQUAL | BER (%) | Assumed value (%) |
|---|---|---|
| 0 Best | < 0.2 | 0.14 |
| 1 | 0.2 ~ 0.4 | 0.28 |
| 2 | 0.4 ~ 0.8 | 0.57 |
| 3 | 0.8 ~ 1.6 | 1.13 |
| 4 | 1.6 ~ 3.2 | 2.26 |
| 5 | 3.2 ~ 6.4 | 4.53 |
| 6 | 6.4 ~ 12.8 | 9.05 |
| 7 | > 12.8 | 18.1 |

*FIG. 5*

APPARATUS AND METHOD FOR DETECTING JAMMING OF COMMUNICATIONS

CROSS REFERENCES TO RELATED APPLICATIONS

"Apparatus and Method for Broadcasting the Detection of RF Jammer Presence" having Ser. No. 12/643,825

"Apparatus and Method for Compromised Vehicle Tracking" having Ser. No. 12/643,498

"Apparatus and Method for Detecting a Cloned Base Station" having Ser. No. 12/643,081

"Apparatus and Method for detecting Communication Interference" having Ser. No. 12/643,068

"Apparatus and Method for Detecting a Cloned Base Station" having Ser. No. 12/643,353

"Apparatus and Method for Determining an Invalid Base Station" having Ser. No. 12/643,463

"Apparatus and Method for Determining Vehicle Location" having Ser. No. 12/643,412

"Apparatus and Method for Maintaining Communication with a Stolen Vehicle Tracking Device" having Ser. No. 12/643,841

"Apparatus and Method for Reducing False Alarms in Stolen Vehicle Tracking" having Ser. No. 12/643,889

"Apparatus and Method for Tracking Stolen Vehicles" having Ser. No. 12/643,862

"Apparatus and Method for Maintaining Communications with a Vehicle in the Presence of Jamming" having Ser. No. 12/643,850 all of which are being filed on the same date as the present application and all of which having their contents incorporated herein by reference in their entireties.

FIELD OF THE INVENTION

The field of the invention relates to communications between various entities and, more specifically to detect the jamming or attempted jamming of these communications.

BACKGROUND

Vehicles are equipped with various types of communication systems that provide or facilitate various types of functions. For instance, a vehicle may be equipped with a global positioning satellite (GPS) system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle. Previous attempts at detecting such jamming and/or attempted jamming and reporting these actions to a security center have generally been unsuccessful and/or expensive to accomplish.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where the jamming or attempted jamming of communications (e.g., vehicular communications) can be detected easily and any instances of the jamming and/or attempted jamming communicated to an emergency reporting system or center and/or other authorized person or persons so that appropriate action can be taken to protect the vehicle or the contents of the vehicle and prevent the occurrence of a crime. To take one example and in the case where the vehicle is actually stolen, the approaches described herein detect jamming of a stolen vehicle tracking (SVT) system disposed within the vehicle. The approaches described herein are easy to use, accurate in determining the occurrence of a jamming or attempted jamming, and cost effective to implement resulting in enhanced security for vehicles and their contents.

In many of these embodiments, location determination signals are received and a location of interest is determined from the location determination signals. The location of interest may be the location of a vehicle or a person to name two examples. Communication service with a known, valid base station is established and synchronized via a first communication channel. A first rate of rise of a signal strength indicator associated with the first communication channel is monitored and a second rate of rise of a signal quality indicator associated with the first communication channel is also monitored. When at least one of the first rate rises at a rate greater than a first predetermined threshold rate or the second rate rises at a rate that is greater than a second predetermined threshold rate, a warning message is transmitted to the known, valid base station before synchronization of the communication service is lost with the base station.

In some aspects, the warning message is transmitted to the base station over the first communication channel. In other examples, the warning message is transmitted to the base station over a second communication channel, and the second communication channel is different than the first communication channel.

In other examples, the warning message is forwarded from the base station to an emergency reporting system and assistance is sent to the location of interest after receiving the warning message at the emergency reporting system. In some examples, the location determination signals are transmitted from a satellite.

The warning message can include or indicate various information of interest. For instance, the warning message may include the location of interest. Other examples of warning messages and contents of these messages are possible.

The signal strength indicator may also include various components or types of information and assume a variety of forms. In one example, the signal strength indicator comprises a Rx Level. Other examples are possible.

In still other aspects, an audible alarm is issued to the user when jamming and/or attempted jamming is detected. This may be accomplished by various types of devices and approaches. For example, various types of audio speakers or sirens may be deployed at or near the vehicle. Various types of visual indicators (e.g., lights) may also be used.

In still others of these embodiments, the jamming of communications between a vehicle and an emergency reporting system is detected. At a vehicle, a location determination signal is received and a location of the vehicle is determined from the location determination signals. Communication service is established and synchronized between the vehicle and a known, valid base station via a first communication channel. A first rate of rise of a signal strength indicator associated with the first communication channel and a second rate of rise of a signal quality indicator associated with the first communication channel are monitored. When at least one of the first rate rises at a rate greater than a first predetermined threshold rate or the second rate rises at a rate greater than a second predetermined threshold rate, a warning message is transmitted to the known, valid base station before synchronization of the communication service is lost with the known, valid base station.

In some examples, the warning message is transmitted over the first communication channel. In other examples, the warning message is transmitted to the base station over a second communication channel and the second communication channel is different than the first communication channel.

In other examples, the warning message is forwarded from the base station to an emergency reporting system and assistance is sent to the vehicle after receiving the warning message at the emergency reporting system. In other examples, the location determination signals are transmitted from a satellite.

In still other embodiments, a device for detecting the jamming of communications between a communication device (e.g., operated by a user) and an emergency reporting system includes an interface and a controller. In one approach, the interface includes an input and an output and the input is configured to receive location determination signals.

The controller is coupled to the interface and is configured to establish and synchronize a communication service with a known, valid base station via a first communication channel that has been established and communicates with the base station at the output of the interface. The controller is further configured to monitor a first rate of rise of a signal strength indicator associated with the first communication channel and monitor a second rate of rise of a signal quality indicator associated with the first communication channel. The controller is further configured to, when at least one of the first rate rises at a rate greater than a first predetermined threshold rate and the second rate rises at a rate greater than a second predetermined threshold rate, transmit a warning message to the known, valid base station at the output of the interface before synchronization of service is lost with the known, valid base station. The base station communicates with an emergency center where action can be taken to stop the jamming.

In some examples, the warning message is transmitted over the first communication channel. In other examples, the warning message is transmitted to the base station over a second communication channel and the second communication channel is different than the first communication channel.

In other aspects, the device may include an alarm indicator. In this case, the controller is further configured to issue an audible alarm upon the transmission of the warning message.

Figure 1:
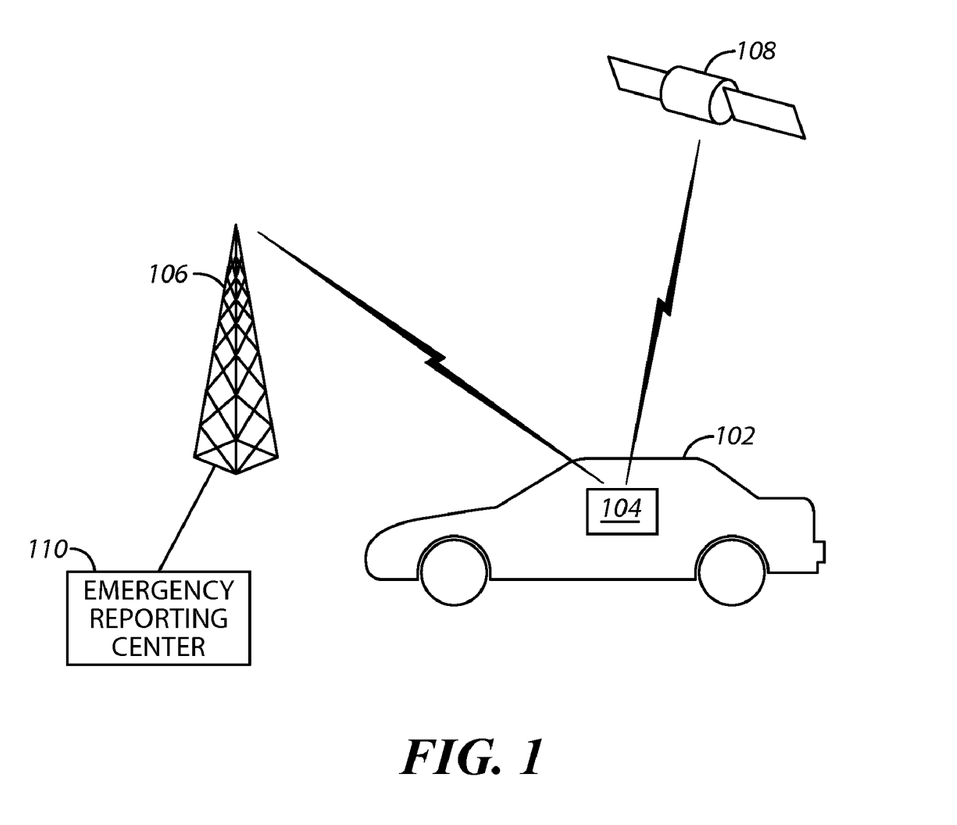
FIG. 1 comprises a block diagram of a system that detects the jamming and/or attempted jamming of communications according to various embodiments of the present invention.

Referring now to FIG. 1, one example of a system for detecting the jamming of vehicular communications is described. A vehicle 102 includes a communication and jamming detection device 104. The communication and jamming detection device 104 is disposed anywhere in or at the vehicle and communicates with a base station 106 and an external navigation system 108. The base station 106 may be coupled to an emergency reporting center 110 (e.g., the police or a private security provider) to which warning messages are transmitted.

The communication and jamming detection device 104 may be, in one example, a programmed electronic device that determines the location of the vehicle 102 from signals received from the navigation system 108 and determines if jamming and/or attempted jamming is occurring as to signals being received and/or being transmitted. Alternatively, another separate device may be used to determine the location of the vehicle and this separate device may communicate with the communication and jamming detection device 104. The external navigation system 108 may be a GPS satellite or satellite system, in one example.

Many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, or even with individuals that are not within or associated with a vehicle.

The vehicle 102 may be any type of vehicle such as a car, truck, bus, airplane, ship, to name a few examples. The communication device 104 is any type of communication device that communicates with entities outside the vehicle 102 using any type of communication technology or protocol. For example, the communication device 104 may be or may incorporate a cellular phone, transponder, radio, or some combination of these or other devices.

In one example of the operation of the system of FIG. 1, at the vehicle 102, a location determination signal from the navigation system 108 is received at the device 104 and the location of the vehicle 102 is determined from the location determination signals by the device 104. Communication service is established and synchronized with the known, valid base station 106 via a first communication channel. In this case, the device 104 is in service and registered on the network.

In some examples, a signal strength indicator is a numeric value that generally indicates the strength of a received signal in cellular communication systems. More specifically, the signal strength indicator is a value that indicates the magnitude of the signals that are transmitted and received within these systems.

A known and valid base station as described herein is a base station with which service has been established. The known and valid base station is assumed not to be a cloned base station with some degree of certainty.

Figure 4:
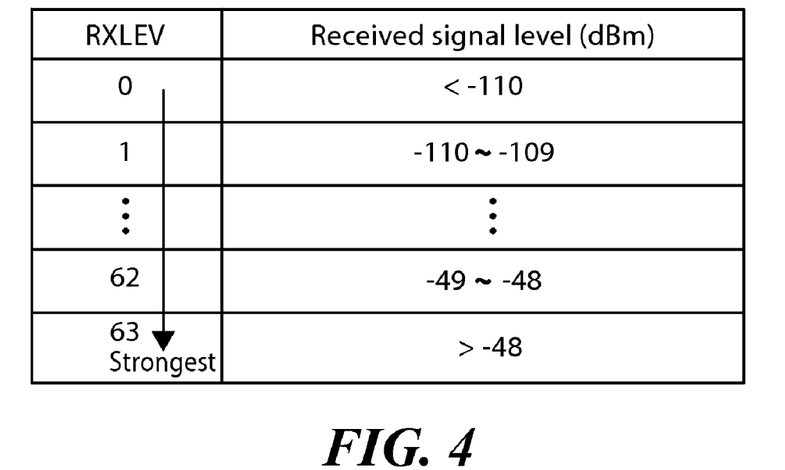
FIG. 4 comprises a block diagram of a Rx Level table according to various embodiments of the present invention.
Figure 5:
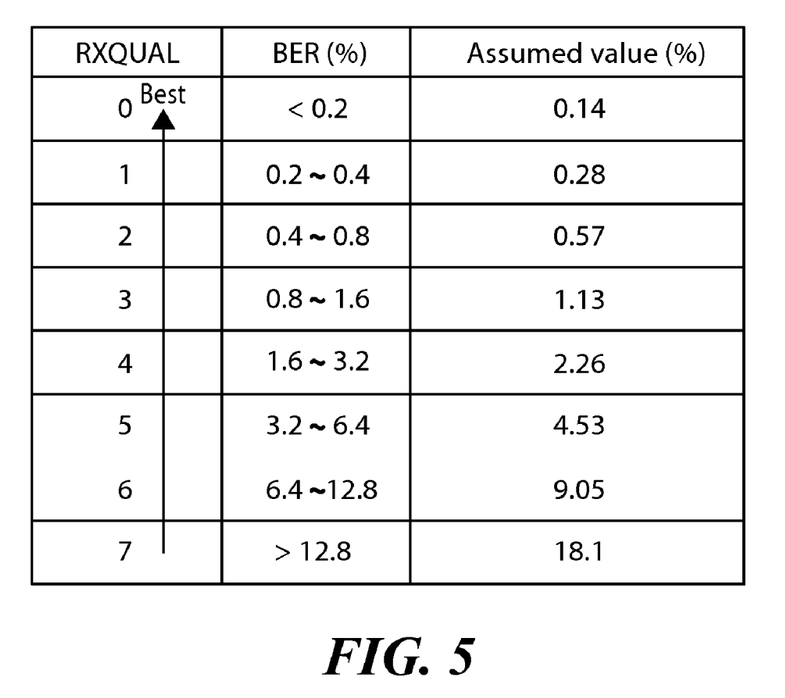
FIG. 5 comprises a block diagram of Rx Qual table according to various embodiments of the present invention.

A first rate of rise of a signal strength indicator associated with the first communication channel and a second rate of rise of a signal quality indicator associated with the first communication channel are monitored. For a GSM system, the signal strength indicator may be Rx Level and the signal quality indicators may be Rx Qual. For a GSM system, Rx Level is an integer number describing how much greater the received signal strength is than −110 dBm. Rx Level can vary between 0 to 63. As shown in the table of FIG. 4, if the Rx Level reading is 39, the received signal strength at the unit is −110 dBm+39=−71 dBm. As shown in the table of FIG. 5, Rx Qual is the self-reported Bit Error rate (BER) estimate on the received signal strength by the mobile. The Rx Qual can vary from 0 to 7. For example, if the unit estimates the BER is around 2.4%, the unit will report a 4 for Rx Qual.

When at least one of the first rate rises at a rate greater than a first predetermined threshold rate and the second rate rises at a rate greater than a second predetermined threshold rate, (and/or the absolute values exceed some predetermined threshold) a warning message is transmitted to the known, valid base station 106 before synchronization of the communication service is lost with the known, valid base station 106. For example, if the vehicle is parked and in service and registered on the network, the unit will be monitoring the Rx Level of the serving cell as well as any neighbors in the BA table. Since the vehicle is not moving, only small variations in Rx Level will be seen. If the unit sees a sudden rise in the Rx Level value, e.g., 6 counts greater than the current valid reading at a rate of 3 units per second, the unit can report that it is in the process of being jammed. The base station communicates with an emergency center where action can be taken to stop the jamming. It will be appreciated the emergency center may be any party authorized or charged to protect the vehicle (such as police center or an off-site, private alarm or security center), and so forth.

It will be appreciated that the rates chosen may be varied according to the needs of users and the system. Since many jamming techniques involve the use of a high power broadband transmission source, the jammer will most likely be quickly enabled and very strong. The rise in Rx Level will be great and fast; values for rates and thresholds are in one example determined experimentally.

Various actions can be taken once jamming is detected. As mentioned, a warning message can be transmitted to an emergency reporting center 108. The emergency reporting center is coupled to the base station 106. For example, this warning message may be transmitted over a GSM network. In other examples, other frequencies and/or other types of networks in addition to or instead of the GSM network can be used to transmit the warning message (and/or transmit or receive other communications). For example, warning messages may be transmitted at FM Radio Data System (RDS) frequencies, over Wireless Local Area networks such as WiFi networks, over infrared (IR) networks, Bluetooth (BT) networks, to "amber alert" stations (e.g., using the Emergency Alert System (EAS) or Emergency Broadcast System (EBS)), over Worldwide Interoperability for Microwave Access (WiMAX) networks, over Code Division Multiple Access/Integrated Digital Enhanced Network (CDMA/iDEN) systems, and/or over Advanced Mobile Phone System (AMPS) networks. In addition, Morse code (or some other coding approach) may be transmitted using the horn and/or headlights of the vehicle 102 (or some other device in the vehicle). In still other examples, a short messaging service (SMS) cell broadcast is made once jamming is detected. Other examples are possible.

Broadcast FM RDS uses a sub-carrier to communicate digital information to the user's radio and to the user. The information for the user is text, such as the station call sign, and is usually presented to the user on the display of the car radio. In the present approaches, RDS may be used to carry a warning message would be to have the SVT unit transmit an RDS message on one or more broadcast FM channels with a text message such as "Help! Stolen Car: silver Chevy license 997 KLM". This message would be received in the vicinity of the stolen vehicle and could be seen by drivers whose cars are in the vicinity of the stolen vehicle. Even though nearby drivers are listening to a standard broadcasting station on the same frequency, the signal from the SVT unit would be received due to its higher signal strength at the receiver due to the small separation distance. One of these drivers could then make a call to the police or some other authority. Due to the short range nature of the communications, the stolen vehicle would be in the vicinity of this person's car.

A security beacon can be activated once jamming is detected. For example, a security beacon such as those manufactured by the LoJack Corporation can be used. The security beacon transmits signals that can be detected and used to locate the vehicle 102. The security beacon can be used in addition to or in place of the communications (e.g., warning messages) that are transmitted, for example, over GSM systems.

In another example, the communication device 104 can transmit a periodic (or non-periodic) "pinging" signal to a server (e.g., a stolen vehicle tracking (SVT) server). If the server detects no pinging signal, it may assume that the vehicle is stolen. The server, in this example, is external to the vehicle 102.

Any number of antennas may be used by the communication device 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

In another aspect, once jamming is detected various actions can be taken that affect the operation of the vehicle and/or a driver's ability to successfully drive the vehicle 102. In these examples, it is assumed that the detection of jamming denotes an attempt by a criminal to steal the vehicle 102 and/or its contents. Consequently, these approaches attempt to stop the theft of the vehicle 102 and/or its contents by adversely affecting the operation of the vehicle so that the criminal has a difficult or impossible time operating the vehicle 102. For example, the radio operation can be changed (e.g., by setting its sound level to a deafening level), the operation of the lights of the vehicle can be adjusted (e.g., by deactivating the lights at night), the operation of the horn can be altered (e.g., by activating the horn), the operation of the stability control system can be altered (e.g., to cause unstable operation), the seat location can be adjusted (e.g., by moving the seat to an uncomfortable position), the operation of heat controlled seats can be changed (e.g., by setting a temperature that is uncomfortable or scalding to a driver), the steering wheel operation can be altered (e.g., by locking the steering wheel), the temperature of the vehicle interior can be changed (e.g., by setting the temperature to an uncomfortable hot or cold setting), and/or the tone of an audible device can be altered (e.g., to produce a deafening tone) based upon the detection of jamming to thereby make theft of the vehicle and/or its contents difficult or impossible for the thief to achieve.

In some examples, areas of known good signal strength are located by the communication device 104 and/or some external device or system. If the signal from the device stops without the vehicle moving, jamming is determined to be occurring. In other aspects, areas of known good signal strength are determined (e.g., a known good signal strength for a particular area, time, or other parameter), and if the signal transmitted from the device varies significantly (e.g., beyond a threshold amount) from expected levels jamming is determined to be occurring. The threshold can be based upon map data provided by a system or device that is disposed external to the communication device 104 and/or developed by the device 104 from previous readings (e.g., during previous drives of the vehicle 102) to name two approaches.

In other aspects, the location of the vehicle 102 can be tracked even as jamming is occurring. For instance, Rx Level and/or Rx Qual readings (e.g., reported by one or more communication devices to an external service center) may be used to identify and/or confirm jammer presence and pinpoint location of the vehicle 102, for example, using triangulation approaches.

In some aspects, the communication device may authenticate the base station 106. For example, various hand-shaking approaches may be used by the communication device to authenticate the base station 106.

Figure 2:
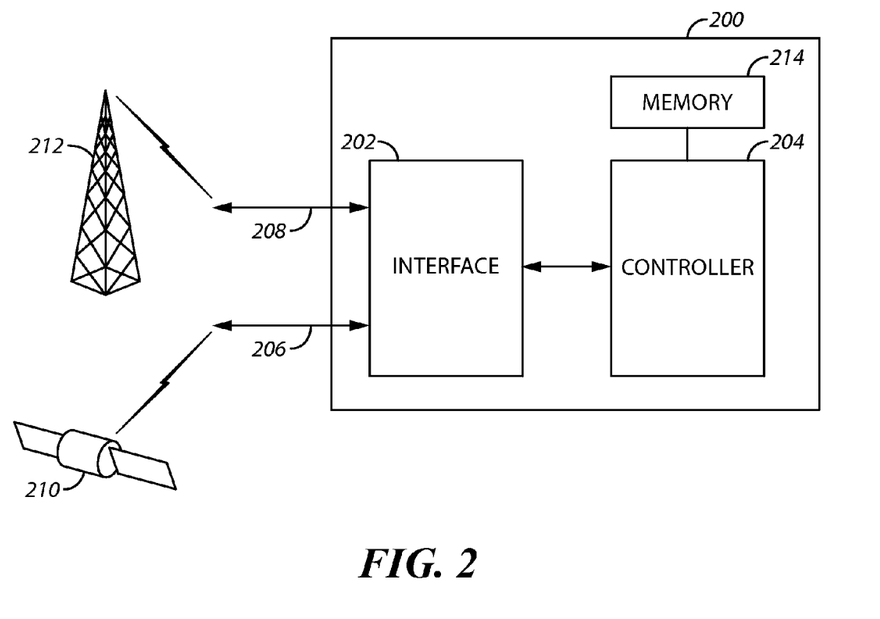
FIG. 2 comprises a block diagram of an apparatus that detects the jamming and/or attempted jamming of communications according to various embodiments of the present invention.

Referring now to FIG. 2, one example of a device for detecting the jamming of communications between a communication device (e.g., operated by a user) and an emergency reporting system is described (e.g., device 104 of FIG. 1). The device 200 includes an interface 202 and a controller 204. A memory 214 may also be included and store computer instructions that execute any of the techniques and approaches described herein.

The interface 202 includes an input 208 and an output 206. The output transmits signals to a valid base station 212 (e.g., at cellular frequencies) and the input 208 is configured to receive location determination signals from an external source 210 (at satellite frequencies). For example, these signals may be received from a GPS satellite or GPS satellite system. Other examples of systems and types of signals are possible. In this regard, the interface 202 includes any analog or digital circuitry and any programmed processing arrangements required to send, receive, and/or process these signals. For instance, the interface may include various antennas, processors, conversion circuitry, transmitters and receivers to transmit and receive cellular and satellite communications.

The controller 204 is coupled to the interface 202 and is configured to establish and synchronize a communication service with the known, valid base station 212 via a first communication channel established with the base station at the output 208 of the interface 202. In one example, communications are established between a registered mobile and a base station.

The controller 204 is further configured to monitor a first rate of rise of a signal strength indicator associated with the first communication channel and monitor a second rate of rise of a signal quality indicator associated with the first communication channel. The controller 204 is further configured to, when at least one of the first rate rises at a rate greater than a first predetermined threshold rate and the second rate rises at a rate greater than a second predetermined threshold rate, transmit a warning message to the known, valid base station at the output of the interface 202 before synchronization of the service is lost with the known, valid base station. The warning message may indicate the location of the vehicle and that attempted jamming is taking place, to name two examples of informational content of the message.

In some examples, the warning message is transmitted to the base station over the first communication channel. In other examples, the warning message is transmitted to the base station over a second communication channel, the second communication channel being different than the first communication channel. The communication channels may be any type of communication conduit that allows a transmitter and a receiver to communicate (e.g., a cellular communication channel, an RF communication channel, or a satellite communication channel to name a few examples.

In other aspects, the device 200 may include an alarm indicator. In this case, the controller is further configured to issue an audible alarm upon the transmission of the warning message. In other examples, a visual alarm may be activated. In still other examples, both audible and visual alarms may be used.

Figure 3:
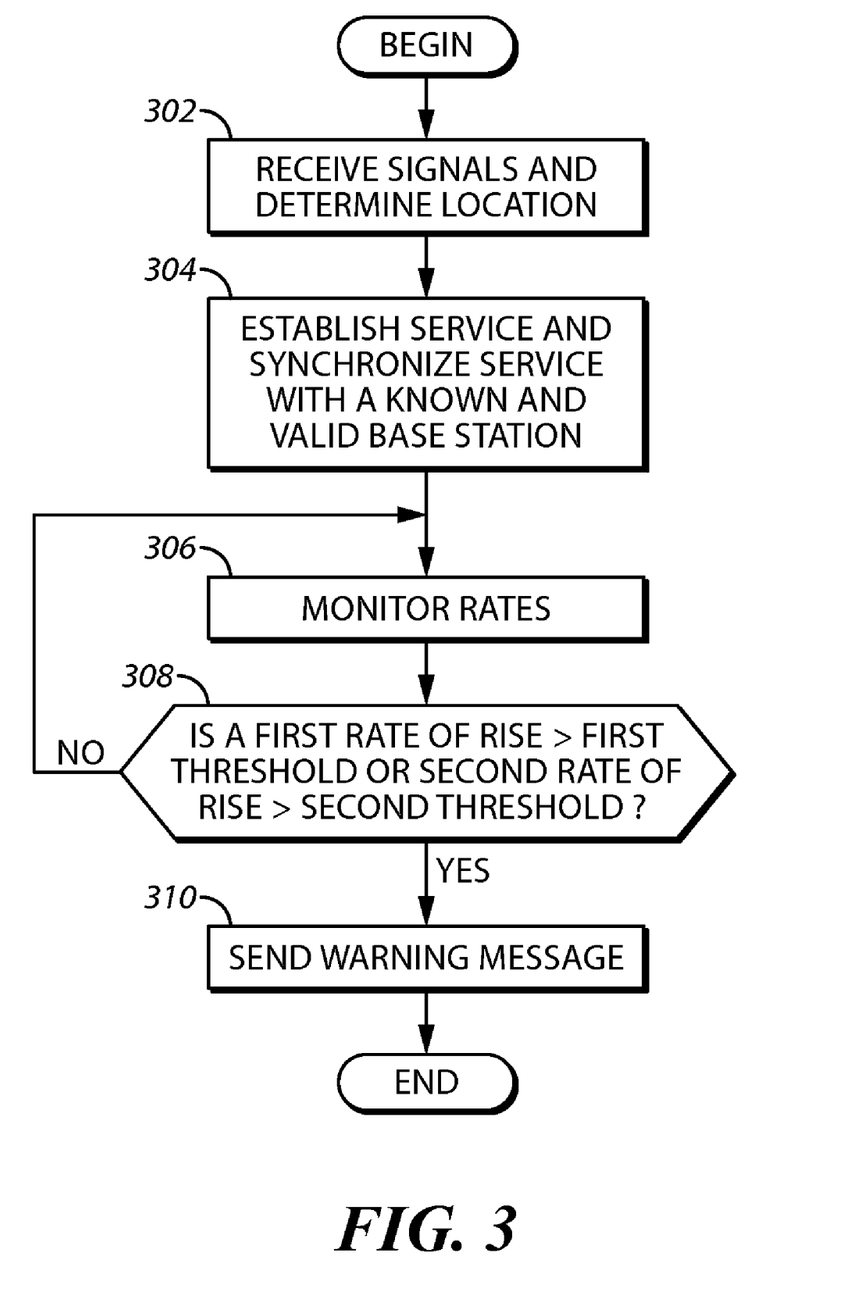
FIG. 3 comprises a flowchart of one example of an approach for detecting the jamming and/or attempted jamming of communications between a communication device and an emergency reporting system according to various embodiments of the present invention.

Referring now to FIG. 3, one example of an approach for preventing the jamming of vehicular communications is described. At step 302, location determination signals are received and a location of interest is determined from the location determination signals. The signals may be received at a vehicle or at some other location. In one example, these systems may be in the format used by GPS satellites.

At step 304, communication service with a known, valid base station via a first communication channel is established and synchronized. For example, communications may be established by known techniques between a registered mobile and a base station according to techniques known to those skilled in the art.

At step 306, a first rate of rise of a signal strength indicator associated with the first communication channel is monitored and a second rate of rise of a signal quality indicator associated with the first communication channel is also monitored. In one example, if the Rx Level value rises to 6 counts greater than the current reading at a rate of 3 units/second, jamming is determined. It will be appreciated that these approaches may also use the value of Rx Level or Rx Qual to determine if jamming is occurring together with the rate of rising.

At step 308, it is determined whether at least one of the first rate rises at a rate greater than a first predetermined threshold rate and the second rate rises at a rate greater than a second predetermined threshold rate. If the answer is affirmative, at step 310 a warning message is transmitted to the known, valid base station before synchronization of the communication service is lost with the known, valid base station. If the answer is negative, control returns to step 306 as described above.

Thus, approaches are provided where the jamming or attempted jamming of communications (e.g., vehicular communications) can be detected easily and any instances of the jamming and/or attempted jamming communicated to an emergency reporting system or center and/or other authorized person or persons so that appropriate action can be taken to protect the vehicle or the contents of the vehicle and prevent the occurrence of a crime. To take one example and in the case where the vehicle is actually stolen, the approaches described herein detect jamming of a stolen vehicle tracking (SVT) system disposed within the vehicle. The approaches described herein are easy to use, accurate in determining the occurrence of a jamming or attempted jamming, and cost effective to implement resulting in enhanced security for vehicles and their contents.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of detecting the jamming of communications between a communication device and an emergency reporting system comprising:
   receiving location determination signals and determining a location of interest from the location determination signals;
   establishing and synchronizing a communication service with a known, valid base station via a first communication channel;
   monitoring a first rate of rise of a signal strength indicator associated with the first communication channel and monitoring a second rate of rise of a signal quality indicator associated with the first communication channel;
   when at least one of the first rate rises at a rate greater than a first predetermined threshold rate and the second rate rises at a rate greater than a second predetermined threshold rate, transmitting a warning message to the known, valid base station before synchronization of the communication service is lost with the known, valid base station.

2. The method of claim 1 wherein the warning message is transmitted over the first communication channel.

3. The method of claim 1 wherein the warning message is transmitted to the base station over a second communication channel, the second communication channel being different than the first communication channel.

4. The method of claim 1 further comprising forwarding the warning message to an emergency reporting system that is configured to send assistance to the location of interest after receiving the warning message at the emergency reporting system.

5. The method of claim 1 wherein the location determination signals are received from a satellite.

6. The method of claim 1 wherein the warning message includes the location of interest.

7. The method of claim 1 wherein the signal strength indicator comprises a received a RX Level.

8. The method of claim 1 further comprising issuing an audible alarm.

9. The method of claim 1 wherein the steps are performed at a vehicle.

10. A device for detecting the jamming of communications between the device and an emergency reporting system comprising:
    an interface with an input and an output, the input configured to receive location determination signals;
    a controller coupled to the interface, the controller configured to establish and synchronize a communication service with a known, valid base station via a first communication channel established with the base station at the output of the interface, the controller further configured to monitor a first rate of rise of a signal strength indicator associated with the first communication channel and monitor a second rate of rise of a signal quality indicator associated with the first communication channel, the controller being further configured to, when at least one of the first rate rises at a rate greater than a first predetermined threshold rate and the second rate rises at a rate greater than a second predetermined threshold rate, transmit a warning message to the known, valid base station at the output of the interface before synchronization of the service is lost with the known, valid base station.

11. The device of claim 10 wherein the warning message is transmitted over the first communication channel.

12. The device of claim 10 wherein the warning message is transmitted to the base station over a second communication channel, the second communication channel being different than the first communication channel.

13. The device of claim 10 further comprising an alarm indicator and wherein the controller is further configured to issue an audible alarm upon the transmission of the warning message.

14. A computer usable medium having a computer readable program code embodied therein, said computer readable program code adapted to be executed to implement a method of detecting the jamming of communications between a communication device and an emergency reporting system, the method comprising:
    determining a location of interest from received location determination signals;
    establishing and synchronizing a communication service with a known, valid base station via a first communication channel;
    monitoring a first rate of rise of a signal strength indicator associated with the first communication channel and monitoring a second rate of rise of a signal quality indicator associated with the first communication channel;
    when at least one of the first rate rises at a rate greater than a first predetermined threshold rate and the second rate rises at a rate greater than a second predetermined threshold rate, forming and transmitting a warning message to the known, valid base station before synchronization of the communication service is lost with the known, valid base station.

15. The computer usable medium of claim 14 wherein the warning message is transmitted over the first communication channel.

16. The computer usable medium of claim 14 wherein the warning message is transmitted to the base station over a second communication channel, the second communication channel being different than the first communication channel.

17. The computer usable medium of claim 14 wherein the method further comprises forwarding the warning message to an emergency reporting system that is configured to send assistance to the location of interest after receiving the warning message at the emergency reporting system.

* * * * *